(12) United States Patent
Slomiany (10) Patent No.: US 8,187,082 B2
(45) Date of Patent: *May 29, 2012

(54) BONUS GAME

(75) Inventor: Scott D. Slomiany, Reno, NV (US)

(73) Assignee: IGT, Reno, NV (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/557,877

(22) Filed: Sep. 11, 2009

(65) Prior Publication Data

US 2010/0004044 A1    Jan. 7, 2010

Related U.S. Application Data (63) Continuation of application No. 10/890,630, filed on Jul. 14, 2004, now Pat. No. 7,601,058, which is a continuation of application No. 09/798,619, filed on Mar. 1, 2001, now Pat. No. 6,769,983.

(51) Int. Cl.
*A63F 13/00* (2006.01)

(52) U.S. Cl. ............ 463/20; 463/16; 463/17; 463/18; 463/19; 463/25; 463/26; 463/27; 463/36

(58) Field of Classification Search .......... 463/16–20, 463/25–28, 36–37, 43
See application file for complete search history.

(56) References Cited

U.S. PATENT DOCUMENTS

| 4,582,324 A | 4/1986 | Koza et al. |
|---|---|---|
| 5,647,798 A | 7/1997 | Falciglia |
| 5,791,991 A | 8/1998 | Small |
| 5,848,932 A | 12/1998 | Adams |
| 5,855,514 A | 1/1999 | Kamille |
| 6,015,346 A | 1/2000 | Bennett |
| 6,033,307 A | 3/2000 | Vancura |
| 6,059,289 A | 5/2000 | Vancura |
| 6,102,798 A | 8/2000 | Bennett |
| 6,149,156 A | 11/2000 | Feola |
| 6,159,097 A | 12/2000 | Gura |
| 6,159,098 A | 12/2000 | Slomiany et al. |
| 6,174,235 B1 | 1/2001 | Walker et al. |
| 6,186,894 B1 | 2/2001 | Mayeroff |

(Continued)

FOREIGN PATENT DOCUMENTS

EP    874 337 A1    10/1998

(Continued)

OTHER PUBLICATIONS

Monopoly Blackjack Edition Game, described in Mikohn brochure, 2000.

(Continued)

*Primary Examiner* — Sunit Pandya
(74) *Attorney, Agent, or Firm* — Neal, Gerber & Eisenberg LLP (57) ABSTRACT

A game for a gaming machine having a plurality of different items to be selected by a player, each item having a value in an amount preset for a given bonus round, and a respective initial quantity in a preset amount. The player selects an item, such as one of many items for purchase in a store, and the value for that item is registered, along with subtraction of a unit from the quantity of that item. Provided that the quantity for that item selected is not then zero, the player continues to select another item, with registration of the value for that item and subtraction until an item is selected thereby having a zero quantity.

32 Claims, 5 Drawing Sheets

U.S. PATENT DOCUMENTS

| | | | |
|---|---|---|---|
| 6,190,255 B1 | 2/2001 | Thomas et al. | |
| 6,224,483 B1 | 5/2001 | Mayeroff | |
| 6,231,442 B1 | 5/2001 | Mayeroff | |
| 6,261,177 B1 | 7/2001 | Bennett | |
| 6,303,469 B1 | 10/2001 | Larson et al. | |
| 6,309,300 B1 | 10/2001 | Glavich | |
| 6,311,976 B1 | 11/2001 | Yoseloff et al. | |
| 6,312,334 B1 | 11/2001 | Yoseloff | |
| 6,315,660 B1 | 11/2001 | DeMar et al. | |
| 6,315,664 B1 | 11/2001 | Baerlocher et al. | |
| 6,319,124 B1 | 11/2001 | Baerlocher et al. | |
| 6,346,043 B1 * | 2/2002 | Colin et al. | 463/17 |
| 6,347,996 B1 * | 2/2002 | Gilmore et al. | 463/17 |
| 6,358,147 B1 | 3/2002 | Jaffe | |
| 6,364,767 B1 | 4/2002 | Brossard et al. | |
| 6,375,187 B1 | 4/2002 | Baerlocher | |
| 6,379,251 B1 | 4/2002 | Auxier et al. | |
| 6,398,218 B1 | 6/2002 | Vancura | |
| 6,439,995 B1 | 8/2002 | Hughs-Baird et al. | |
| 6,450,883 B1 | 9/2002 | O'Halloran | |
| 6,506,118 B1 | 1/2003 | Baerlocher et al. | |
| 6,511,375 B1 | 1/2003 | Kaminkow | |
| 6,514,141 B1 | 2/2003 | Kaminkow et al. | |
| 6,558,254 B2 | 5/2003 | Baelocher et al. | |
| 6,592,457 B1 | 7/2003 | Frohm et al. | |
| 6,595,854 B2 | 7/2003 | Hugh-Baird et al. | |
| 6,599,185 B1 | 7/2003 | Kaminkow et al. | |
| 6,602,137 B2 | 8/2003 | Kaminkow et al. | |
| 6,607,438 B2 | 8/2003 | Baerlocher et al. | |
| 6,632,141 B2 | 10/2003 | Webb et al. | |
| 6,648,754 B2 | 11/2003 | Baerlocher et al. | |
| 6,676,516 B2 | 1/2004 | Baerlocher et al. | |
| 6,692,356 B2 | 2/2004 | Baerlocher et al. | |
| 6,722,981 B2 | 4/2004 | Kamikow et al. | |
| 6,722,982 B2 | 4/2004 | Kamikow et al. | |
| 6,733,386 B2 | 5/2004 | Cuddy et al. | |
| 6,749,504 B2 | 6/2004 | Hughs-Baird | |
| 6,769,983 B2 | 8/2004 | Slomiany | |
| 6,783,457 B2 | 8/2004 | Hughs-Baird et al. | |
| 6,875,108 B1 | 4/2005 | Hughs-Baird | |
| 6,899,620 B2 | 5/2005 | Kamikow et al. | |
| 6,932,701 B2 | 8/2005 | Glavich et al. | |
| 6,966,833 B2 | 11/2005 | Kamikow et al. | |
| 7,029,395 B1 | 4/2006 | Baerlocher | |
| 7,112,137 B2 | 9/2006 | Baerlocher et al. | |
| 7,160,188 B2 | 1/2007 | Kamikow et al. | |
| 7,182,689 B2 | 2/2007 | Hughs-Baird et al. | |
| 7,273,415 B2 | 9/2007 | Cregan et al. | |
| 7,316,609 B2 | 1/2008 | Dunn et al. | |
| 7,329,179 B2 | 2/2008 | Baerlocher | |
| 7,364,159 B2 | 4/2008 | Berman et al. | |
| 7,371,166 B1 | 5/2008 | Webb et al. | |
| 2001/0024970 A1 | 9/2001 | McKee et al. | |
| 2002/0052232 A1 | 5/2002 | Kaminkow | |
| 2003/0040358 A1 | 2/2003 | Rothkranz et al. | |
| 2003/0060266 A1 * | 3/2003 | Baerlocher | 463/20 |
| 2005/0054429 A1 | 3/2005 | Baerlocher | |
| 2005/0054435 A1 | 3/2005 | Rodgers et al. | |
| 2005/0056999 A1 | 3/2005 | Roemer et al. | |
| 2005/0060050 A1 | 3/2005 | Baerlocher | |
| 2005/0096123 A1 | 5/2005 | Cregan | |
| 2007/0015566 A1 | 1/2007 | Baerlocher et al. | |
| 2007/0060271 A1 | 3/2007 | Cregan et al. | |
| 2007/0129131 A1 | 6/2007 | Kaminkow et al. | |
| 2007/0149269 A1 | 6/2007 | Benbrahim | |
| 2008/0004105 A1 | 1/2008 | Cregan et al. | |

FOREIGN PATENT DOCUMENTS

| | | |
|---|---|---|
| EP | 926 645 A2 | 6/1999 |
| EP | 945 837 A2 | 9/1999 |
| EP | 984 407 A2 | 3/2000 |
| EP | 984 408 A2 | 3/2000 |
| EP | 989 531 A2 | 3/2000 |

OTHER PUBLICATIONS

Monopoly Blackjack Edition Game, website article. http://www mikohn.com/products/tablesgames/Monopoly_Blackjack.com, Dec. 14, 2001.

Monopoly Poker Edition Game, website article. http://www.mikohn.com/products/tablesgames/Monopoly_Poker.com Dec. 14, 2001.

* cited by examiner

FIG. 8

BONUS GAME

PRIORITY CLAIM

This application is a continuation application of, claims priority to and the benefit of U.S. patent application Ser. No. 10/890,630, filed on Jul. 14, 2004, which is a continuation of U.S. patent application Ser. No. 09/798,619, filed on Mar. 1, 2001, now U.S. Pat. No. 6,769,983, the entire contents of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

This invention generally relates to gaming machines, although it can conceivably have broader application to games in general, and more particularly to a novel bonus game for gaming machines.

BACKGROUND OF THE INVENTION

Slot machines, poker machines, blackjack machines and similar gaming machines are abundant. Some, such as slot machines, may be mechanical devices without any video component. Machines to play card games, as well as slot machines, are more and more based upon a video monitor as the display mechanism for the game, with the game itself governed by a microprocessor-based system.

The popularity of the games, and these gaming machines, derive from a number of factors, some of which are the apparent likelihood of winning (typically money in a wagering environment), the attractiveness of the game machine, and the basic level of entertainment provided by the game/machine. It is therefore one general driving force in the gaming industry to come up with new and exciting games and gaming machines which will attract players, entertain them, and promote repeated play.

One way that has been tried to accomplish the foregoing has been to enhance the play of a base game, where the base game may be a relatively standard-type game already established in the industry, with a bonus game. Such a bonus game can be one which is similar to the underlying game being played, or can be completely unrelated to the base game in the sense of being a game different from that being played as the base game. For instance, the bonus round could be a separate wheel which is spun in the course of play of a slots game when triggered by some event in the slots game.

In general, the bonus game will ordinarily have some increased value associated with its play, and/or a statistically higher probability of success, just to name two ways in which a heightened player appeal may be generated. A bonus game along some of the foregoing lines previously developed by the inventor hereof is disclosed in U.S. Pat. No. 6,159,098.

SUMMARY OF THE INVENTION

It is accordingly a principal objective of the present invention to provide a new game in the form of a bonus game, which in a presently preferred form is particularly adapted as a bonus game for a gaming machine. In this environment, it could be applied to a spinning reel slot machine, or a video slot machine, a video card-game machine, or any other game of chance, for that matter. Again, although the invention will be primarily described hereafter as a bonus game associated with a video gaming machine, it could readily be adapted for a live casino game at a gaming table, for instance, where the bonus game could be displayed on a video monitor as an adjunct to the gaming table.

In accordance with the foregoing principal objective, the invention takes the form in one aspect as a method of playing a bonus game associated with a gaming machine operated by a processor. The gaming machine has a base game, which can be of any known (or hitherto unknown) type.

The bonus game has a plurality of different items to be selected by a player, each item having a value in a first amount preset for a given bonus round. In a preferred embodiment, each item has a respective initial quantity ranging from one to a second amount preset for the bonus round. The bonus round is selected for operation (play) if a predetermined event occurs in the base game.

The bonus round is set up for play with the items displayed for player selection. One contemplated embodiment uses the format of a store with products to be selected by the player and placed in a depiction of a shopping cart. In this embodiment, quantity values for the items are not initially revealed to the player.

A player interface mechanism (e.g., touch screen, mouse, keypad etc.) is provided through which the player can select a desired item. The player makes a first selection of an item through operation of the interface mechanism, and there is a registration of the value for the item of that first selection, as well as a subtraction of a unit from the quantity for that item.

The player makes another selection of an item unless the first item quantity is zero after the first selection, in which event the bonus round is over. If the quantity is not zero, however, the second selection is registered as to its value, and subtraction of a unit from the quantity for that item then occurs. This sequence continues until an item is selected having a zero quantity after subtracting a unit from the quantity for that item.

The invention has likewise found application as a gaming machine, which includes a processor having a program for operating and controlling play of a base game, and for operating and controlling play in a bonus game. Here again, the bonus game has a plurality of different items to be selected by a player, each item having a value in a first amount preset for a given bonus round, and a respective initial quantity ranging from one to a second amount preset for the bonus round. A variation of the invention also contemplates having an initial zero quantity, but this is not considered most desirable in a bonus format.

A display driven by the processor shows the items for player selection. A player interface mechanism communicating with the processor provides commands from the player for selection of a desired item. As with the method described above, the player makes a first selection of an item through operation of the interface mechanism, with a registration mechanism registering the value for that item, and subtracting a unit from the quantity for that item. Play of the bonus round continues with the player making another selection of an item unless the first item quantity is zero after the first selection, in which event the bonus round is terminated by the program. Otherwise, play of the bonus round and this gaming machine continues until a zero quantity occurs.

The operation of the bonus round can occur in the course of play of the base game immediately upon a predetermined event occurring. The base game is returned to upon conclusion of the bonus round. In a preferred form of the invention, the value for a selected item is displayed only after its initial selection.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

The bonus game in the embodiment described herein is a "shopping" game in which the player selects one or more items from a variety of goods to put in his or her shopping cart. In this particular embodiment, there are fifteen different items for the player to select from. They are denoted by the rectangles containing the letters "A" through "O" shown in FIG. 1.

Each item has coin value (its price, or credit value) and a number in "stock" (i.e., the quantity of the item that the player may select before the item is "sold out"). At the start of the bonus round, the CPU randomly sets the price and quantity in stock of each item. The programming for randomly generating these values, as well as driving the display and otherwise controlling and operating the play of the game, is readily understood by those of skill in this art.

The bonus game is initiated by some predetermined event in the base, or underlying game, which could be the achievement of a threshold score, or some random happening, such as a bonus symbol(s) appearing on a payline of a slot machine, just for one example. It may be triggered in the course of play of the base game, with a return to the base game, or at the end of the base game.

At the start of the bonus game, the player does not know any of the values assigned to quantity or coin (credit). The coin value for each item is set to one of the following values, although there are many sets of values that may be used, as is well known to those skilled in the art: 5, 10, 15, 20, 25, 30, 40, 50, 100. The number of items in stock for each item is set to a number between one and five items. This range may be modified in ways that, once again, are well known to those skilled in the art. Likewise, the credit value could be made known at the outset, although this is not presently considered to be the most advantageous presentation.

Figure 1:
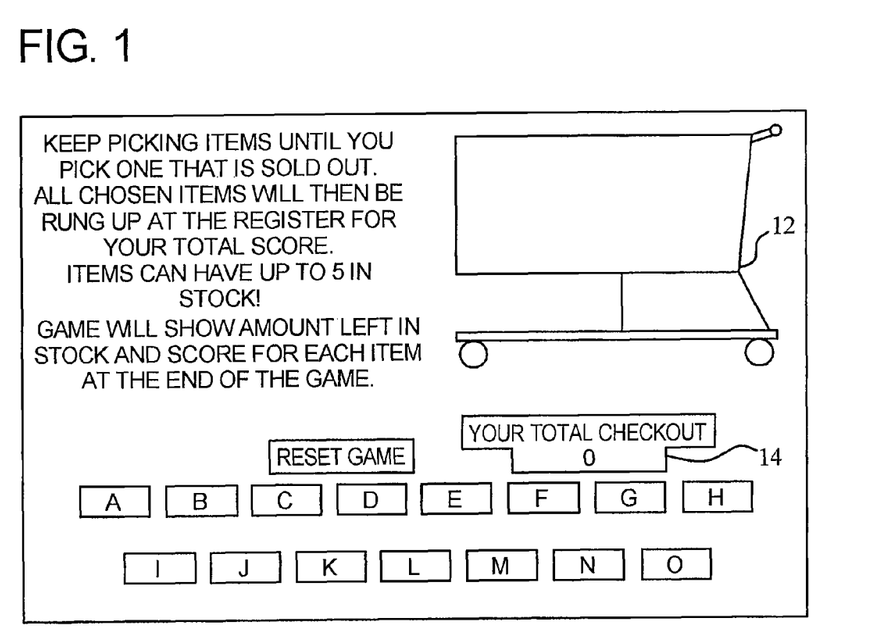
FIGS. 1, 2, 3, 4, 5 and 6 are illustrations of screens of a display at various points in the course of play of a bonus game in accordance with the teachings of the present invention.
Figure 2:
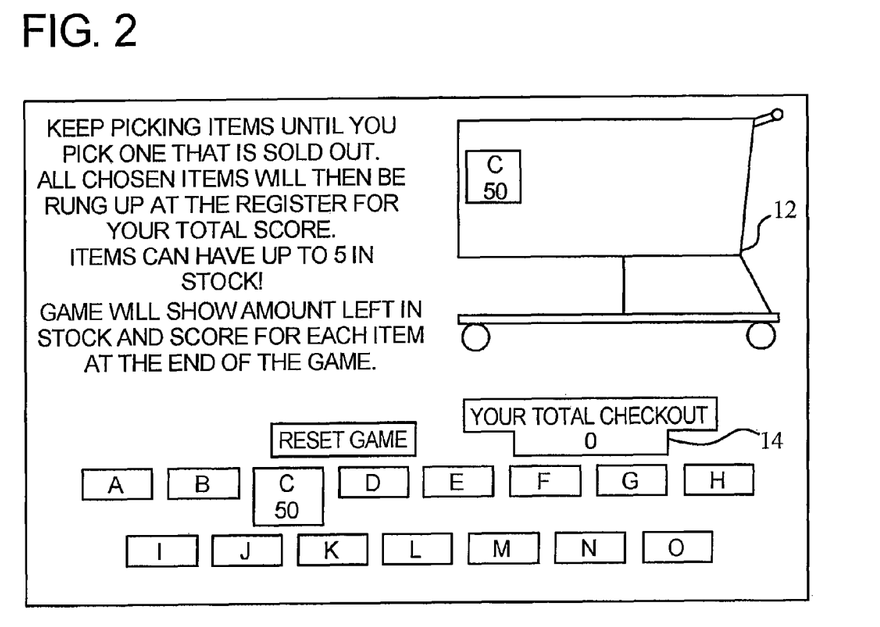

The bonus round is played by having the player select from the items A through O in FIG. 1. The player selects an item (such as from a variety of grocery products, just to name one kind of goods) by pointing at the rectangle containing the item. FIGS. 1 through 6 depict representative screens of a display monitor 10, schematically illustrated in the block diagram of FIG. 7. This is done using a mouse, touch screen or other pointing device as is well known by those skilled in the art. Once an item is selected, the coin value of that item is revealed. FIG. 2 shows the bonus game after the player has selected item "C" as the first item.

Item C is worth fifty coins. FIG. 2 shows the player's "Shopping Cart" 12 which has one item of "C" after the first pick. After the selected item is moved to the shopping cart 12, the game will show a "SOLD OUT" message if the last item of that type was selected. For instance, if the number in stock of item C was only one, then item C would be sold out (zero remaining) after the first pick, and the game would end. Since the "SOLD OUT" message did not appear in the present illustrative example of the bonus game, the player is ready to make a second pick.

Figure 3:
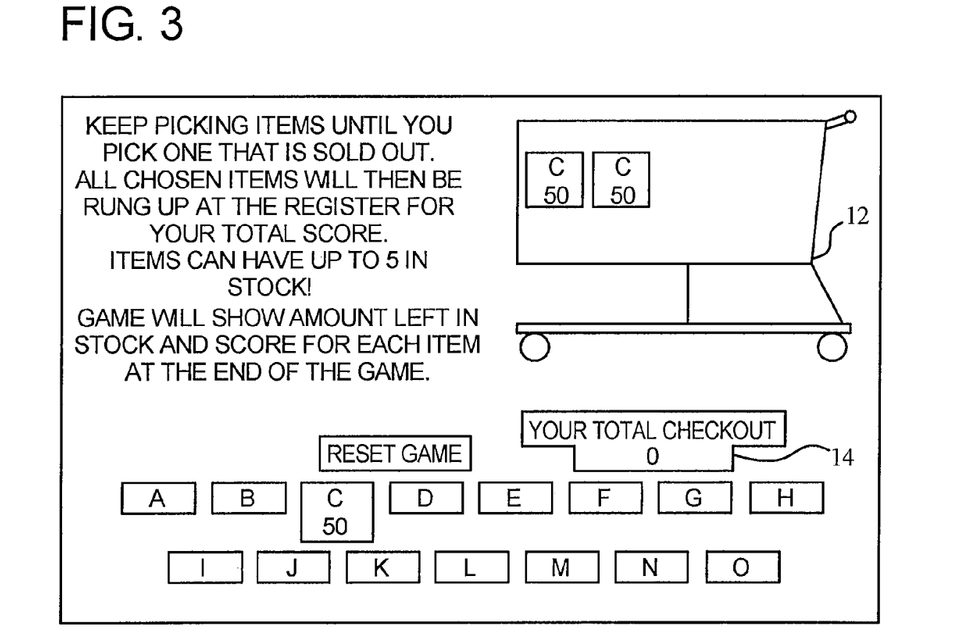

FIG. 3 shows the display after the player selects another item C. Knowing that fifty coins is a high payout for an item, the player selected item C again to receive another fifty coins. The shopping cart 12 in FIG. 3 now shows two representations of item C worth fifty coins each. If the number in stock of item C was only two at the start of the game, however, then the game would now display "SOLD OUT", and the bonus round would be over. Since this illustrative embodiment has more than two of item C, the player may continue to pick a new item, or take a chance on item C again, until the "SOLD OUT" indicator appears.

Figure 4:
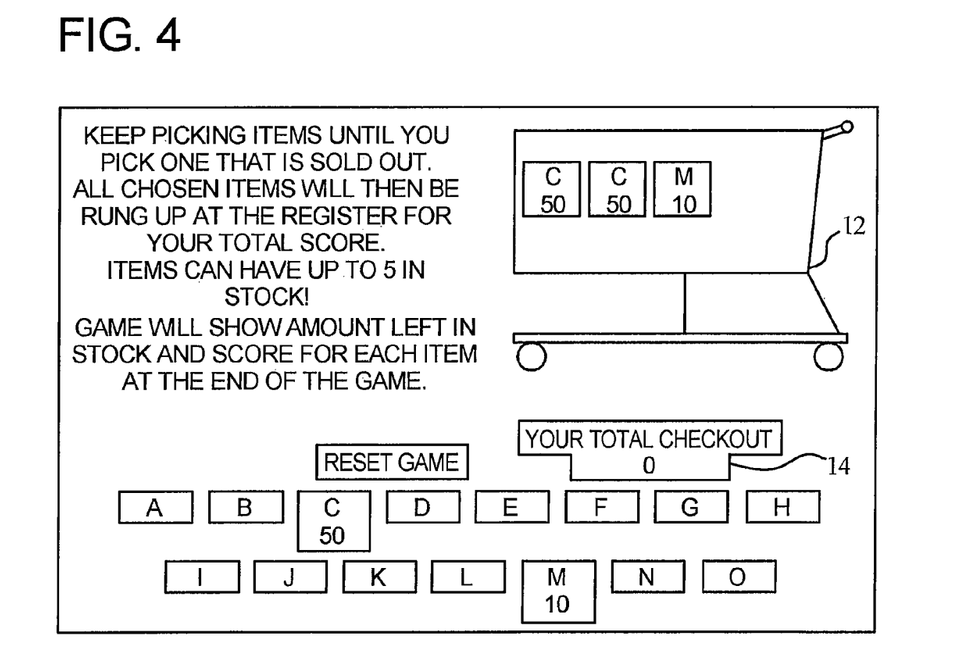

FIG. 4 shows the screen of the display 10 after the player has made the next pick, this time of item M. Item M is worth ten coins in this bonus game, and since it did not show "SOLD OUT", there must be more units of item M left; so the bonus round continues. Item M is added to the shopping cart 12.

Figure 5:
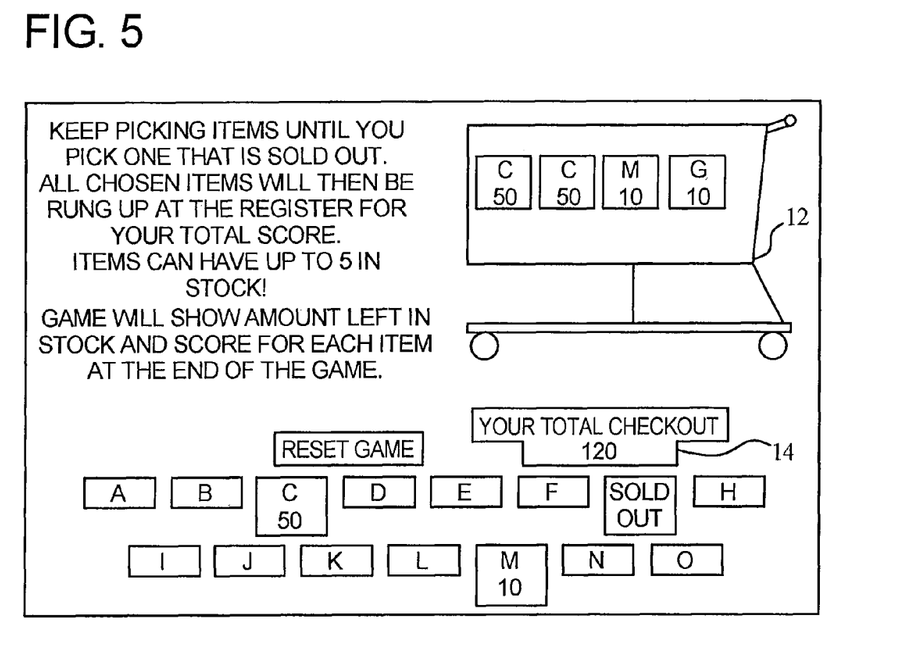

FIG. 5 shows the screen of the display 10 after the player has selected item G as the next pick. Item G turns out to be worth ten coins, and it is placed in the shopping cart 12. There was only one unit of item G available at the start of the game, however, so the selection of item G results in item G being sold out (as shown by the "SOLD OUT" indicium in FIG. 5), and thus the bonus game ends. The total of the items in the shopping cart are added up (registered), and shown to be 120 coins in the "Your Total Checkout" window 14.

Figure 6:
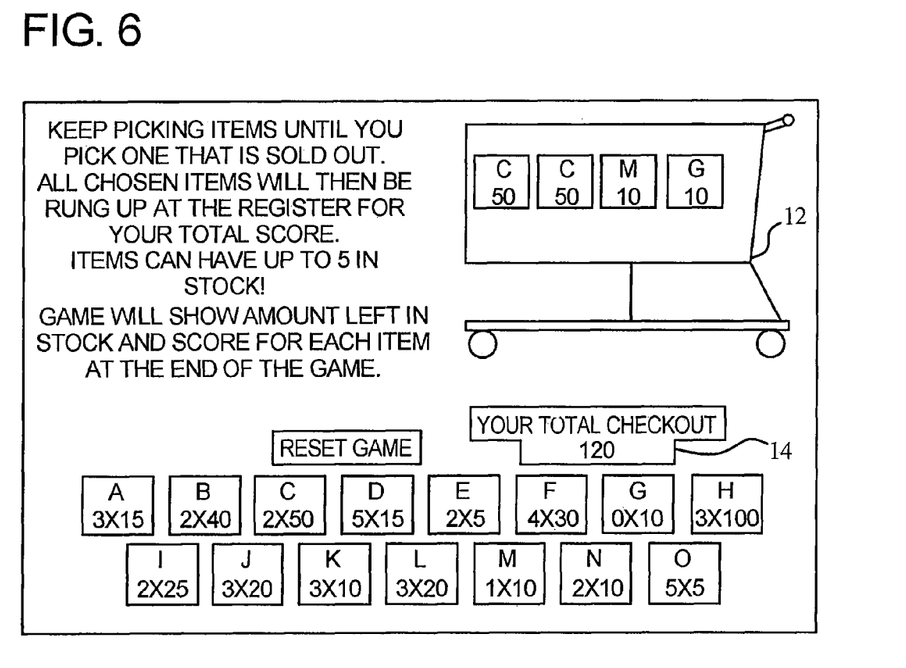

FIG. 6 shows the screen after the checkout value has been posted (window 14), now revealing to the player the value of each item and how many of each item remain in stock. This allows the player to see which items could have been chosen without ending the game. It can be seen that the player could have taken a third item C without ending the game, but would have ended the game had the player taken a second item M. Two item H's could have been acquired for 100 coins each without ending the game, for 200 more coins; if the third item H was also selected, this would have given the player 300 more coins, while ending the game but with a better final award than the ten coins for item G (which ended the game in this illustrative example). The end-of-game screen revealing the remaining quantities and values need not be provided, but this is considered to enhance the entertainment value of the bonus game, and whet the player's appetite for future play.

Figure 7:
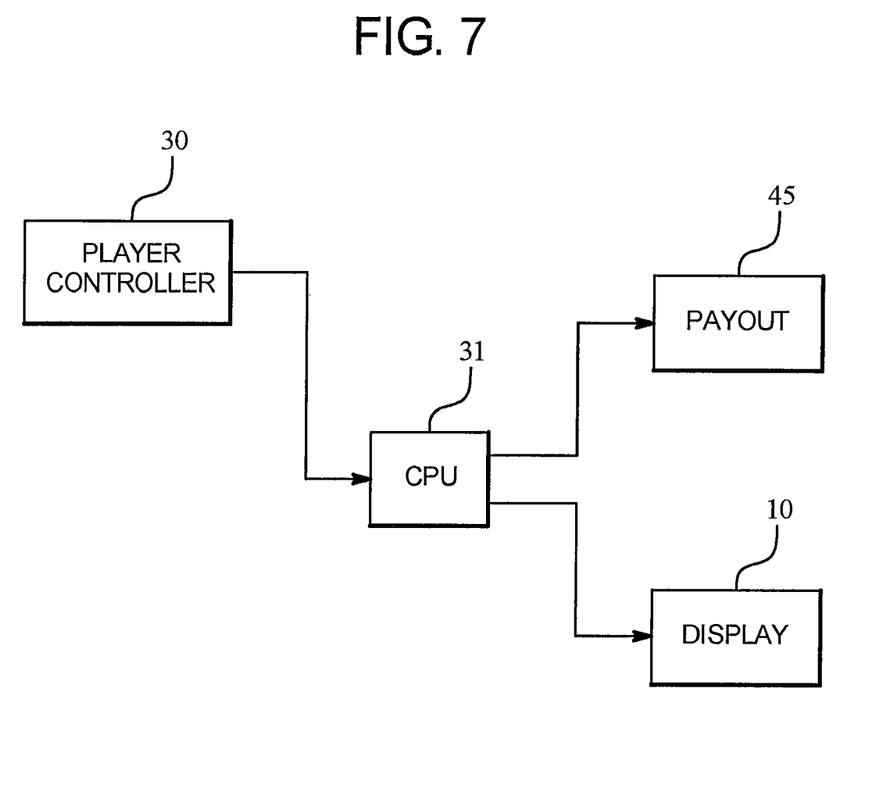
FIG. 7 is a block diagram of a control system for play of an embodiment of the present invention.
Figure 8:
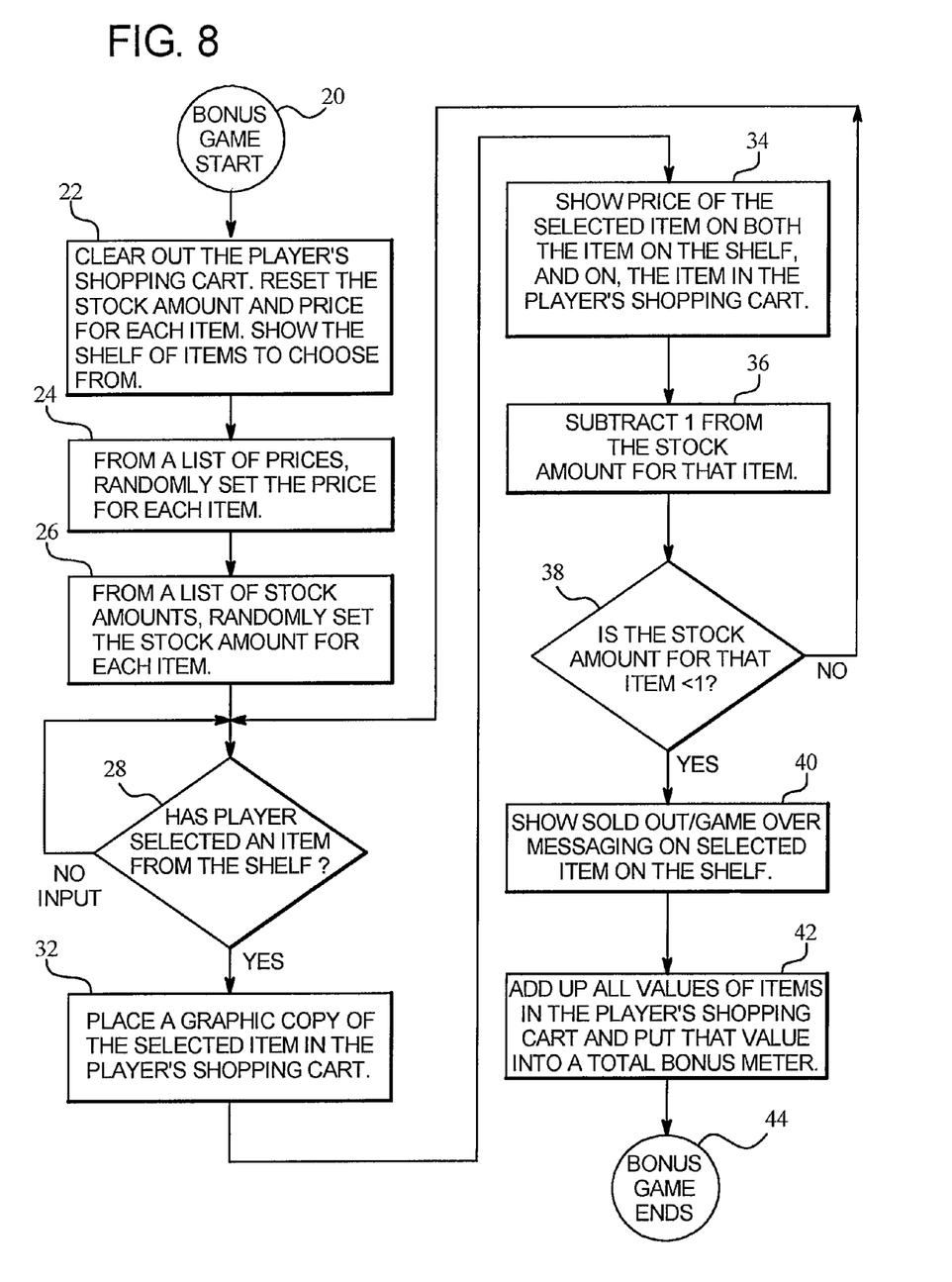
FIG. 8 is a flow diagram of control and operation of play of a bonus game as illustrated and described with respect to FIGS. 1 through 6.

A flowchart for the operation of the foregoing bonus game is shown in FIG. 8. Referring to that FIG. 8 in conjunction with FIG. 7, the bonus game is triggered at step 20. The programming of the CPU sets up the display (video monitor 10) of the empty shopping cart 12, and the shelf of items A through O, along with incidental instructions, windows (e.g., 14) graphics, music, lights and the like, clearing any previous display and values/quantities for the bonus round, all as indicated at step 22. A predetermined list of prices is provided in the program, and these are then randomly assigned for each item (step 24), as are the quantities for each item, also being randomly assigned from a predetermined list of quantities (step 26).

The player now chooses an item at step 28, through input via any number of commonly used interface mechanisms 30 to indicate a player command signal to the CPU 31. That item is then depicted in the shopping cart 12 (step 32), along with registration and display of the "Price" (coins, value, credit, etc.) both in the cart and below the item on the shelf (step 34). The program subtracts a unit from the quantity ("stock amount") for that item (step 36), and if the quantity is not zero after subtraction (step 38), the bonus game continues through a return to step 28. If the quantity is zero, however, then the "SOLD OUT" indicium is displayed, and a game-over sequence commences (step 40). The values of all of the items in the cart 12 are added, and the total is displayed in the "Your Total Checkout" meter window 14 (step 42). The bonus game is thereupon concluded (step 44), with a return to the point of play of the base game where the bonus round was triggered or the start of a new base game (if the bonus round occurs at the end of the base game, rather than in the course of play of the underlying game). A payout, provided through one of many well known mechanisms 45, may occur upon completion of the bonus round, or that total value earned in the bonus round may be added as a credit to the base game, just to name two options.

The video display 10 may comprise a CRT, LED, dot matrix or any other commonly known display device. The CPU is also of a common and well known variety selected as desired, and would of course include memory, software, operational instructions and data associated with both the underlying game and the bonus game.

It is worth noting that a program for the foregoing embodiment uses a list of fifteen credit values (for the "cost") of the items, and shuffles them randomly to assign them to the items at the start of each game. Table 1 below shows the fifteen values used by this illustrative example:

TABLE 1

| 5 | 5 | 10 | 10 | 10 | 10 | 15 | 15 | 20 | 20 | 25 | 30 | 40 | 50 | 100 |
|---|---|---|---|---|---|---|---|---|---|---|---|---|---|---|

There is a list of fifteen numbers used to set the number in stock (quantity) of each item. The program randomly shuffles the fifteen quantity numbers and randomly assigns them to the items. Table 2 shows the "in stock" numbers used herein:

TABLE 2

| 1 | 2 | 2 | 2 | 2 | 2 | 3 | 3 | 3 | 3 | 3 | 4 | 4 | 5 | 5 |
|---|---|---|---|---|---|---|---|---|---|---|---|---|---|---|

This version of the bonus game has an "optimal play" aspect when trying to determine the expected value (EV) of the bonus round. Once the player sees some of the values, and having knowledge of previous play of the game, the player can then estimate the coin value as well as likely quantity of known (selected) items, and the expected value of making a pick from the unknown (not yet selected) items. The optimal play at any point is the choice with the highest expected value. It is considered that optimal play for this version may well be to continue to select items with higher coin values, such as 50 and 100 coins, even at the risk that the bonus round may thereby end sooner rather than later.

Given this model of scrambling the values of Table 1 and Table 2, it is these values that would get adjusted to raise or lower the expected value. There are other ways in which the coin values and in stock quantities could be set at the start of a game, including the use of one of many random tables that define each credit value and quantity explicitly.

A variation of the bonus game described above could have the initial quantity of some of the items set at zero, that is, there would be no credit awarded if such an item was initially selected and the bonus game would be over. This is not considered to be the most advantageous presentation of the bonus game, however, since achieving some "success" during the round enhances the attractiveness of play.

The value of the bonus game could also be linked to a wager placed upon the underlying, or base, game. For example, with the bonus game associated with a video slot game, the bonus game value may be set as a function of three "drums" or like indicia being achieved, with an expected value of 50 times the line bet in the bonus game for example; four "drums" would establish the bonus game with an expected value of 150 times the line bet; and five "drums" would start the bonus such that it had an expected value of 1000 times the line bet. Using the store embodiment described above, the expected value would be modified by using different tables for the item cost and for the stock amount of each item. There would be one set of tables for an EV of 50, a second set of tables for an EV of 150 and a third set of tables for an EV of 1000. If the player has bet more than one coin per line, then each item cost will be multiplied by the amount bet on the line.

Thus, while the present invention has been described with respect to a particular embodiment, those possessing skill in the art will recognize modification, substitutions, changes, adaptations and the like that may be made thereto without departing from the spirit and scope of the invention, and such variations are considered to fall within the ambit of the invention, as is intended to be set forth in the following claims.

The invention is claimed as follows:

1. A gaming device comprising:
   a display device;
   an input device;
   a processor; and
   a memory device which stores a plurality of instructions, which when executed by said processor, cause said processor to operate with said display device and said input device to:
   (a) receive a first wager in association with a first play of a game, said first play of the game having a first average expected value;
   (b) for the first play of the game:
      (i) for each of a first plurality of selections, determine an initial quantity of outcomes from a plurality of different initial quantities of outcomes, said initial quantity of outcomes determined for at least one of said first plurality of selections being greater than one, and said initial quantity of outcomes determined for at least one of said first plurality of selections being different than another initial quantity of outcomes determined for another one of said first plurality of selections;
      (ii) thereafter, cause one of the first plurality of selections to be picked;
      (iii) modify the quantity of outcomes associated with said selection picked from said first plurality of selections prior to and independent of another one of said selections of said first plurality of selections being picked; and
      (iv) repeat steps (ii) to (iii) until the quantity of outcomes associated with at least one of said selections picked from said first plurality of selections is modified to a first designated quantity of outcomes, such that at least one of said selections of said first plurality of selections is pickable a plurality of times;

(c) receive a second, different wager in association with a second, different play of the game, said second play of the game having a second, different average expected value; and (d) for the second play of the game:
  (i) for each of a second plurality of selections, determine an initial quantity of outcomes from the plurality of different initial quantities of outcomes, said initial quantity of outcomes determined for at least one of said second plurality of selections being greater than one, and said initial quantity of outcomes determined for at least one of said second plurality of selections being different than another initial quantity of outcomes determined for another one of said second plurality of selections;
  (ii) thereafter, cause one of the second plurality of selections to be picked;
  (iii) modify the quantity of outcomes associated with said selection picked from said second plurality of selections prior to and independent of another one of said selections of said second plurality of selections being picked; and
  (iv) repeat steps (ii) to (iii) until the quantity of outcomes associated with at least one of said selections picked from said second plurality of selections is modified to a second designated quantity of outcomes, such that at least one of said selections of said second plurality of selections is pickable a plurality of times.

2. The gaming device of claim 1, wherein the initial quantity of outcomes determined for at least one of the selections of said first plurality of selections is determined based, at least in part, on the first received wager, and the initial quantity of outcomes determined for at least one of the selections of said second plurality of selections is determined based, at least in part, on the second received wager.

3. The gaming device of claim 1, wherein at least one of said outcomes of said initial quantity of outcomes determined for at least one of the selections of said first plurality of selections is determined based, at least in part, on the first received wager, and at least one of said outcomes of said initial quantity of outcomes determined for at least one of the selections of said second plurality of selections is determined based, at least in part, on the second placed wager.

4. The gaming device of claim 1, wherein the first plurality of selections and the second plurality of selections each include the same selections.

5. The gaming device of claim 4, wherein the initial quantity of outcomes determined for at least one of the selections of said first plurality of selections is determined based, at least in part, on the first received wager, and the initial quantity of outcomes determined for at least one of the selections of said second plurality of selections is determined based, at least in part, on the second received wager.

6. The gaming device of claim 4, wherein at least one of said outcomes of said initial quantity of outcomes determined for at least a first one of the selections of said first plurality of selections is different than each of the outcomes of said initial quantity of outcomes determined for the same first selection of the second plurality of selections.

7. The gaming device of claim 4, wherein the initial quantity of outcomes determined for at least a first selection of said first plurality of selections is different than the initial quantity of outcomes determined for the same first selection of the second plurality of selections.

8. The gaming device of claim 1, wherein at least one of said outcomes of said initial quantity of outcomes determined for at least one of said selections of said first plurality of selections is different than each of said outcomes of said initial quantity of outcomes determined for each of said selections of said second plurality of selections.

9. The gaming device of claim 1, wherein the initial quantity of outcomes determined for at least one of said selections of said first plurality of selections is different than the initial quantity of outcomes determined for each of said selections of said second plurality of selections.

10. The gaming device of claim 1, wherein at least one of said outcomes of said initial quantity of outcomes determined for at least one of said selections of said first plurality of selections is different than each of said outcomes of said initial quantity of outcomes determined for each of said selections in said second plurality of selections, and the initial quantity of outcomes determined for at least one of said selections in said first plurality of selections is different than the initial quantity of outcomes determined for each of said selections in said second plurality of selections.

11. The gaming device of claim 1, wherein said modification of said quantity of outcomes is an increase in the quantity of outcomes.

12. The gaming device of claim 1, wherein when executed by said processor, the plurality of instructions cause said processor to operate with said display device to display at least one of the outcomes of the initial quantity of outcomes determined for each picked selection and to provide each displayed outcome to a first player for the first play of the game, and when executed by said processor, the plurality of instructions cause said processor to operate with said display device to display at least one of the outcomes of the initial quantity outcomes determined for each picked selection and to provide each displayed outcome to a second player for the second play of the game.

13. The gaming device of claim 12, wherein the first player and the second player are the same player.

14. The gaming device of claim 1, wherein the first designated quantity of outcomes and the second designated quantity of outcomes are different.

15. The gaming device of claim 1, wherein the first designated quantity of outcomes and the second designated quantity of outcomes are each zero.

16. A gaming device comprising:
  a display device;
  an input device;
  a processor; and
  a memory device which stores a plurality of instructions, which when executed by said processor, cause said processor to operate with said display device and said input device to:
  (a) receive a wager in association with a play of a primary game;
  (b) if a first triggering event occurs in association with the play of the primary game, for a play of a secondary game having a first average expected value:
    (i) for each of a first plurality of selections, determine an initial quantity of outcomes from a plurality of different initial quantities of outcomes, said initial quantity of outcomes determined for at least one of said first plurality of selections being greater than one, and said initial quantity of outcomes determined for at least one of said first plurality of selections being different than another initial quantity of outcomes determined for another one of said first plurality of selections;
    (ii) thereafter, cause one of the first plurality of selections to be picked;
    (iii) modify the quantity of outcomes associated with said selection picked from said first plurality of selections prior to and independent of another one of said selections of said first plurality of selections being picked; and (iv) repeat steps (ii) to (iii) until the quantity of outcomes associated with at least one of said selections picked from said first plurality of selections is modified to a first designated quantity of outcomes, such that at least one of said selections of said first plurality of selections is pickable a plurality of times; and (c) if a second, different triggering event occurs in association with the play of the primary game, for a different play of the secondary game having a second, different average expected value:

(i) for each of a second plurality of selections, determine an initial quantity of outcomes from the plurality of different initial quantities of outcomes, said initial quantity of outcomes determined for at least one of said second plurality of selections being greater than one, and said initial quantity of outcomes determined for at least one of said second plurality of selections being different than another initial quantity of outcomes determined for another one of said second plurality of selections;

(ii) thereafter, cause one of the second plurality of selections to be picked;

(iii) modify the quantity of outcomes associated with said selection picked from said second plurality of selections prior to and independent of another one of said selections of said second plurality of selections being picked; and (iv) repeat steps (ii) to (iii) until the quantity of outcomes associated with one of said selections picked from said second plurality of selections is modified to a second designated quantity of outcomes, such that at least one of said selections of said second plurality of selections is pickable a plurality of times.

17. The gaming device of claim 16, wherein the initial quantity of outcomes determined for at least one of the selections of said first plurality of selections is determined based, at least in part, on the first triggering event, and the initial quantity of outcomes determined for at least one of the selections of said second plurality of selections is determined based, at least in part, on the second triggering event.

18. The gaming device of claim 17, wherein the initial quantity of outcomes determined for at least one of the selections of said first plurality of selections is determined based, at least in part, on the received wager, and the initial quantity of outcomes determined for at least one of the selections of said second plurality of selections is determined based, at least in part, on the received wager.

19. The gaming device of claim 16, wherein at least one of said outcomes of said initial quantity of outcomes determined for at least one of the selections of said first plurality of selections is determined based, at least in part, on the first triggering event, and at least one of said outcomes of said initial quantity of outcomes determined for at least one of the selections of said second plurality of selections is determined based, at least in part, on the second triggering event.

20. The gaming device of claim 19, wherein at least one of said outcomes of said initial quantity of outcomes determined for at least one of the selections of said first plurality of selections is determined based, at least in part, on the received wager, and at least one of said outcomes of said initial quantity of outcomes determined for at least one of the selections of said second plurality of selections is determined based, at least in part, on the received wager.

21. The gaming device of claim 16, wherein the first plurality of selections and the second plurality of selections each include the same selections.

22. The gaming device of claim 21, wherein the initial quantity of outcomes determined for at least one of the selections of said first plurality of selections is determined based, at least in part, on the first triggering event, and the initial quantity of outcomes determined for at least one of the selections of said second plurality of selections is determined based, at least in part, on the second triggering event.

23. The gaming device of claim 21, wherein at least one of said outcomes of said initial quantity of outcomes determined for at least a first one of the selections of said first plurality of selections is different than each of said outcomes of said initial quantities of outcomes determined for the same first selection of the second plurality of selections.

24. The gaming device of claim 21, wherein the initial quantity of outcomes determined for at least a first selection of said first plurality of selections is different than the initial quantity of outcomes determined for the same first selection of the second plurality of selections.

25. The gaming device of claim 16, wherein at least one of said outcomes of said initial quantity of outcomes determined for at least one of said selections of said first plurality of selections is different than each of said outcomes of said initial quantity of outcomes determined for each of said selections of said second plurality of selections.

26. The gaming device of claim 16, wherein the initial quantity of outcomes determined for at least one of said selections of said first plurality of selections is different than the initial quantity of outcomes determined for each of said selections of said second plurality of selections.

27. The gaming device of claim 16, wherein at least one of said outcomes of said initial quantity of outcomes determined for at least one of said selections of said first plurality of selections is different than each of said outcomes of said initial quantity of outcomes determined for each of said selections in said second plurality of selections, and the initial quantity of outcomes determined for at least one of said selections in said first plurality of selections is different than the initial quantity of outcomes determined for each of said selections in said second plurality of selections.

28. The gaming device of claim 16, wherein said modification of said quantity of outcomes is an increase in the quantity of outcomes.

29. The gaming device of claim 16, wherein when executed by said processor, the plurality of instructions cause said processor to operate with said display device to display at least one of the outcomes of the initial quantity of outcomes determined for each picked selection and to provide each displayed outcome to a first player for the first play of the secondary game and when executed by said processor, the plurality of instructions cause said processor to operate with said display device to display at least one of the outcomes of the initial quantity outcomes determined for each picked selection and to provide each displayed outcome to a second player for the second play of the secondary game.

30. The gaming device of claim 29, wherein said first player and said second player are the same player.

31. The gaming device of claim 16, wherein the first designated quantity of outcomes and the second designated quantity of outcomes are different.

32. The gaming device of claim 16, wherein the first designated quantity of outcomes and the second designated quantity of outcomes are each zero.

* * * * *

UNITED STATES PATENT AND TRADEMARK OFFICE
CERTIFICATE OF CORRECTION

| | | |
|---|---|---|
| PATENT NO. | : 8,187,082 B2 | Page 1 of 1 |
| APPLICATION NO. | : 12/557877 | |
| DATED | : May 29, 2012 | |
| INVENTOR(S) | : Scott D. Slomiany | |

It is certified that error appears in the above-identified patent and that said Letters Patent is hereby corrected as shown below:

IN THE CLAIMS

In Claim 3, Column 7, Line 43, replace "placed" with --received--.
In Claim 23, Column 10, Line 15, replace "quantities" with --quantity--.

Signed and Sealed this
Twenty-third Day of October, 2012

David J. Kappos
*Director of the United States Patent and Trademark Office*